No. 856,054. PATENTED JUNE 4, 1907.
F. GUTJAHR.
ELECTRICALLY HEATED STOVE.
APPLICATION FILED JUNE 13, 1906.

Witnesses:
Inventor
Fritz Gutjahr,
by Attorneys.

UNITED STATES PATENT OFFICE.

FRITZ GUTJAHR, OF BERLIN, GERMANY.

ELECTRICALLY-HEATED STOVE.

No. 856,054.　　　Specification of Letters Patent.　　Patented June 4, 1907.

Application filed June 13, 1906. Serial No. 321,527.

*To all whom it may concern:*

Be it known that I, FRITZ GUTJAHR, fabrikant, a subject of the King of Prussia, residing at Berlin, Alte Jakobstr 173, Germany, have invented certain new and useful Improvements in Electrically-Heated Stoves, of which the following is a specification, reference being had therein to the accompanying drawings.

The invention relates to a stove that is provided with an electric heating device, and that combines the advantages of an electric heater with the comfort of a tiled stove.

The main heating devices of steam and electric heating systems as at present constructed are subject to the disadvantage that they are, comparatively, of small size, and that they consequently possess but little superficial area, with the result that the air must be partially superheated in order to heat an apartment to the same extent as an apparatus possessing a larger surface; while a further disadvantage results from the fact that, their volume being small, they are unable to store up and give out a large quantity of heat. The rapidity with which, in apparatus of this class, cooling takes place, and the resulting inequalities in the amounts of heat given out, are the direct outcome, on the one hand, of their low heat-storing capacity, and, on the other hand, of the excessive heating due to their small surfaces.

Now this invention has for object to obviate the defects above referred to, and to this end, in stoves in accordance therewith, the heating device is arranged to heat a large stove capable of storing a considerable quantity of heat, and of radiating in a fairly uniform manner; while the surface of the heating device itself is, moreover, relatively large. In consequence of this arrangement the heat is both uniformly radiated and uniformly diffused through the apartment, while the superheating and consequent disagreeable dryness of the air which has heretofore usually taken place is obviated.

Figure 1:
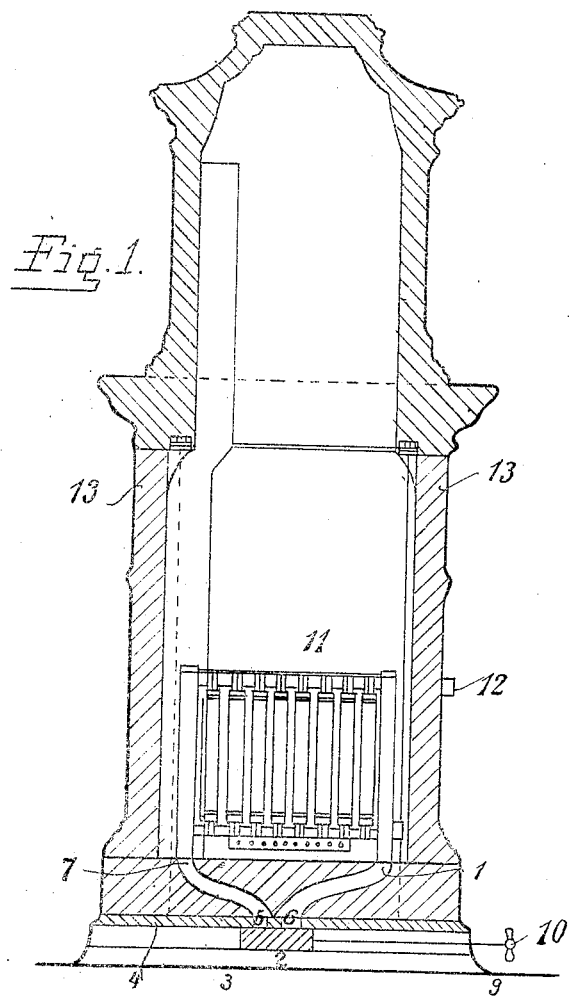
Figure 2:
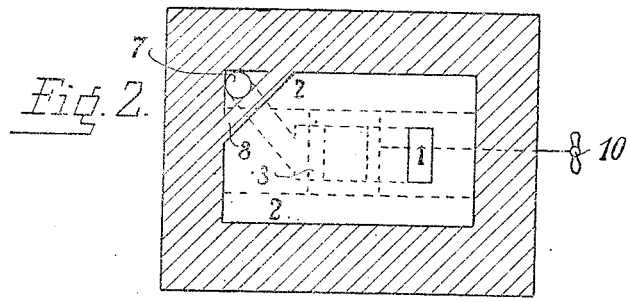

The accompanying drawing illustrates apparatus in accordance with this invention; Figure 1 being a vertical and Fig. 2 a horizontal section thereof.

In the internal cavity of a large stove 13, preferably constructed of majolica, brick, or other suitable heat insulating material, there is arranged the heating device 11. The said internal cavity is divided into two unequal parts by a wall 8, which cuts off one of its corners to form a compartment that is connected with the open air by means of a passage 7, 5. The main portion of the interior of the stove is also connected with the open air by means of a passage 1, 6. The apertures 5, 6 of these passages, which may be so constructed as to constitute a single aperture, terminate in an iron bed-plate 4, that supports the floor of the stove, and can be closed by means of a slide 3 movable in guides 2 by means of a handle 10. The current is led in through the aperture 12.

The operation of the apparatus is as follows:—Upon the starting of the apparatus, the apertures 5 and 6 are opened to produce an increased circulation of air; for which purpose there are, moreover, provided apertures in the base 9 of the stove. When the apparatus is heated, the cold air ascends through the passage 5, 7, along the wall 8, while the surplus air due to expansion in consequence of the heat escapes through the passage 1, 6. As, however, this latter passage is arranged in the lower part of the stove, only so much hot air escapes as is necessitated by the expansion. After the stove has been slightly heated, the passages 5 and 6 are closed.

It is advantageous to arrange in the upper portion of the stove heat collecting firebricks similar to those used in the well-known Siemens' regenerator furnaces.

A stove suitable for a room of ordinary size can, by means of the apparatus just described, be heated in one hour by a current of 1½ kilowatts to an extent sufficient to enable it to radiate heat in a practically uniform manner during a period of from 8 to 9 hours; while the room is comfortably heated in about half an hour. The current can be cut off after the lapse of one hour, or, if it is desired that the stove should retain its heat for a longer period than from 8 to 9 hours, the current can be reduced to a minimum.

What I do claim as my invention and desire to secure by Letters Patent is:

1. A stove comprising a hollow outer portion composed of a material adapted to store and to insulate heat; within said outer portion, a partition whereby the cavity thereof is divided into two compartments that at their upper portions are in communication with each other, and that at their lower portions are each in communication with the outer air; within one of said compartments, a heating device adapted to be electrically energized.

2. A stove comprising a hollow outer portion composed of a material adapted to store and radiate heat; within said outer portion— a partition that, by cutting off a corner of the interior thereof divides the said interior into two unequal compartments; within the larger of said compartments, an electric heating device; a stove base wherein there are formed passages; pipes or conduits whereby said passages are placed in communication with the said compartments; and means adapted to close said passages.

In testimony whereof I affix my signature in the presence of two witnesses.

FRITZ GUTJAHR.

Witnesses:
HENRY HASPER,
WOLDEMAR HAUPT.